US008038878B2

(12) United States Patent
Hewkin

(10) Patent No.: US 8,038,878 B2
(45) Date of Patent: Oct. 18, 2011

(54) INTEGRATED FILTER SYSTEM FOR A COOLANT RESERVOIR AND METHOD

(75) Inventor: David Hewkin, Battle Creek, MI (US)

(73) Assignee: Mann+Hummel GmbH, Ludwigsburg (DE)

( * ) Notice: Subject to any disclaimer, the term of this patent is extended or adjusted under 35 U.S.C. 154(b) by 145 days.

(21) Appl. No.: 12/626,659

(22) Filed: Nov. 26, 2009

(65) Prior Publication Data

US 2010/0132817 A1    Jun. 3, 2010

Related U.S. Application Data

(60) Provisional application No. 61/117,996, filed on Nov. 26, 2008.

(51) Int. Cl.
*B01D 35/027* (2006.01)
(52) U.S. Cl. ............... 210/167.32; 210/254; 210/434; 137/544
(58) Field of Classification Search ............... None
See application file for complete search history.

(56) References Cited

U.S. PATENT DOCUMENTS

| 2,488,806 | A | * | 11/1949 | Crowder | 123/41.55 |
|---|---|---|---|---|---|
| 2,672,853 | A | * | 3/1954 | Dunnigan | 123/41.08 |
| 3,214,023 | A | * | 10/1965 | Donner | 210/172.2 |
| 3,330,439 | A | * | 7/1967 | Moorman | 220/86.2 |
| 3,726,262 | A | * | 4/1973 | Moon | 123/41.1 |
| 3,752,222 | A | * | 8/1973 | Olbermann, Jr. | 165/280 |
| 3,757,984 | A | * | 9/1973 | Barton | 220/265 |
| 4,033,872 | A | * | 7/1977 | Mori | 210/167.04 |
| 4,185,750 | A | * | 1/1980 | Op den Camp | 220/501 |
| 4,210,176 | A | * | 7/1980 | Emming | 137/573 |
| 4,241,578 | A | * | 12/1980 | Keene | 60/478 |
| 4,325,678 | A | * | 4/1982 | Kanamaru et al. | 417/313 |
| 4,343,353 | A | * | 8/1982 | Tsopelas | 165/119 |
| 4,424,829 | A | * | 1/1984 | Millington et al. | 137/590 |
| 4,431,027 | A | * | 2/1984 | Sabina, Jr. | 137/574 |
| 4,461,342 | A | * | 7/1984 | Avrea | 165/104.32 |
| 4,473,037 | A | * | 9/1984 | Michassouridis et al. | 123/41.1 |
| 4,480,598 | A | * | 11/1984 | Berrigan | 123/41.27 |
| 4,527,709 | A | * | 7/1985 | Kondo et al. | 220/501 |
| 4,625,777 | A | * | 12/1986 | Schmidt | 141/286 |
| RE32,434 | E | * | 6/1987 | Avrea | 165/104.32 |
| 4,677,943 | A | * | 7/1987 | Skinner | 123/41.27 |
| 4,723,596 | A | * | 2/1988 | Spindelboeck et al. | 165/104.32 |
| 4,738,228 | A | * | 4/1988 | Jenz et al. | 123/41.51 |
| 4,739,730 | A | * | 4/1988 | Jenz et al. | 123/41.54 |
| 4,772,402 | A | * | 9/1988 | Love | 210/804 |
| 4,793,403 | A | * | 12/1988 | Vataru et al. | 165/95 |
| 4,809,745 | A | * | 3/1989 | Hormann | 137/574 |

(Continued)

FOREIGN PATENT DOCUMENTS

DE    102009042275 A1 *    4/2010

(Continued)

*Primary Examiner* — Robert James Popovics
(74) *Attorney, Agent, or Firm* — James Hasselbeck

(57) ABSTRACT

A simple, low cost, replaceable coolant filtering is integrated in a coolant reservoir bottle or reservoir tank of an internal engine liquid cooling system. The coolant filtering system intercepts coolant flowing between the engine cooling system and the coolant reservoir, removing particulates from the coolant by filtration, entrapping the removed particulates on the filter media as well as capturing larger particulates into a drainable cup-like depression provided within the coolant reservoir. Also a coolant bypass passage is operative to permit coolant to bypass the filter should the filter media become blocked with contaminants.

7 Claims, 3 Drawing Sheets

U.S. PATENT DOCUMENTS

| | | | | |
|---|---|---|---|---|
| 4,809,769 A * | 3/1989 | Vataru et al. | | 165/95 |
| 4,813,477 A * | 3/1989 | Hansen et al. | | 165/278 |
| 4,823,862 A * | 4/1989 | Temmesfeld et al. | | 165/104.32 |
| 4,861,467 A * | 8/1989 | Fukuhara | | 210/167.04 |
| 4,923,001 A * | 5/1990 | Marcolin | | 165/140 |
| 5,088,453 A * | 2/1992 | Kleineberg et al. | | 123/41.54 |
| 5,104,294 A * | 4/1992 | Banba | | 417/36 |
| 5,111,776 A * | 5/1992 | Matsushiro et al. | | 123/41.54 |
| 5,139,658 A * | 8/1992 | Hodge | | 210/167.01 |
| 5,163,506 A * | 11/1992 | Attinger et al. | | 165/104.32 |
| 5,280,868 A * | 1/1994 | Ueno et al. | | 248/205.1 |
| 5,281,331 A * | 1/1994 | Golan | | 210/131 |
| 5,329,889 A * | 7/1994 | Caldwell | | 123/41.54 |
| 5,356,535 A * | 10/1994 | Ueno et al. | | 210/416.5 |
| 5,456,218 A * | 10/1995 | Theorell | | 123/41.54 |
| 5,680,833 A * | 10/1997 | Smith | | 123/41.54 |
| 5,718,281 A * | 2/1998 | Bartalone et al. | | 165/41 |
| 5,753,116 A | 5/1998 | Baumann et al. | | |
| 5,829,268 A * | 11/1998 | Mertens | | 62/503 |
| 5,906,221 A * | 5/1999 | Mancell | | 137/549 |
| 5,918,760 A * | 7/1999 | Frodin et al. | | 220/661 |
| 5,950,695 A * | 9/1999 | Smith | | 141/326 |
| 5,992,481 A * | 11/1999 | Smith | | 141/326 |
| 6,027,658 A * | 2/2000 | Soble et al. | | 210/801 |
| 6,035,930 A * | 3/2000 | Schwartz | | 165/169 |
| 6,056,139 A * | 5/2000 | Gericke | | 220/203.06 |
| 6,145,860 A * | 11/2000 | Yu et al. | | 280/124.159 |
| 6,193,895 B1* | 2/2001 | Dea et al. | | 210/765 |
| 6,216,646 B1* | 4/2001 | Smith et al. | | 123/41.54 |
| 6,220,283 B1* | 4/2001 | Saarinen et al. | | 137/550 |
| 6,247,442 B1* | 6/2001 | Bedard et al. | | 123/198 E |
| 6,286,545 B1* | 9/2001 | Moy et al. | | 137/574 |
| 6,382,245 B1* | 5/2002 | Ito | | 137/550 |
| 6,475,425 B1* | 11/2002 | Filion et al. | | 264/570 |
| 6,502,630 B1* | 1/2003 | MacFarlane et al. | | 165/51 |
| 6,708,653 B2* | 3/2004 | Lefrançois et al. | | 123/41.54 |
| 6,718,916 B2* | 4/2004 | Hewkin | | 123/41.54 |
| 6,782,926 B1* | 8/2004 | Hughes | | 141/98 |
| 6,858,134 B2* | 2/2005 | Yates | | 210/167.01 |
| 6,913,040 B2* | 7/2005 | Crossman et al. | | 137/587 |
| 6,929,739 B2* | 8/2005 | Pohl et al. | | 210/90 |
| 7,004,206 B2* | 2/2006 | Viken et al. | | 141/1 |
| 7,048,851 B2* | 5/2006 | Decaux | | 210/186 |
| 7,160,447 B2* | 1/2007 | Yates | | 210/167.04 |
| 7,188,588 B2* | 3/2007 | Hewkin | | 123/41.54 |
| 7,191,739 B1* | 3/2007 | Klop et al. | | 123/41.54 |
| 7,216,610 B2* | 5/2007 | Dunkle | | 123/41.54 |
| 7,246,636 B2* | 7/2007 | Dudra et al. | | 137/565.17 |
| 7,261,123 B2* | 8/2007 | Kim | | 137/550 |
| 7,261,816 B2* | 8/2007 | Suzuki et al. | | 210/282 |
| 7,343,884 B1* | 3/2008 | Carney et al. | | 123/41.54 |
| 7,354,511 B2* | 4/2008 | Becker | | 210/167.02 |
| 7,383,795 B2* | 6/2008 | Lawrence et al. | | 123/41.54 |
| 7,552,839 B2* | 6/2009 | Padget | | 220/564 |
| 7,591,330 B2* | 9/2009 | Kamman | | 180/53.4 |
| 7,635,427 B2* | 12/2009 | Suzuki et al. | | 210/282 |
| 7,644,727 B2* | 1/2010 | Dudra et al. | | 137/565.17 |
| 7,654,410 B2* | 2/2010 | Prince et al. | | 220/564 |
| 7,779,862 B2* | 8/2010 | Sanderson et al. | | 137/574 |
| 7,846,603 B2* | 12/2010 | Druenert et al. | | 429/437 |
| 7,947,171 B2* | 5/2011 | Takemoto | | 210/167.32 |
| 2002/0189559 A1* | 12/2002 | Hewkin | | 123/41.54 |
| 2005/0005584 A1* | 1/2005 | Decaux | | 55/423 |
| 2005/0016909 A1* | 1/2005 | Decaux | | 210/184 |
| 2005/0106433 A1* | 5/2005 | Takemoto | | 429/24 |
| 2005/0115884 A1* | 6/2005 | Suzuki et al. | | 210/282 |
| 2006/0000757 A1* | 1/2006 | Becker | | 210/171 |
| 2006/0118067 A1* | 6/2006 | Hewkin | | 123/41.54 |
| 2007/0017918 A1* | 1/2007 | Kirk et al. | | 220/563 |
| 2007/0119770 A1* | 5/2007 | Suzuki et al. | | 210/282 |
| 2007/0221554 A1* | 9/2007 | Wright | | 210/120 |
| 2007/0235458 A1* | 10/2007 | Hewkin | | 220/612 |
| 2008/0233448 A1* | 9/2008 | Druenert et al. | | 429/26 |
| 2009/0233134 A1* | 9/2009 | Hobmeyr et al. | | 429/26 |
| 2010/0089913 A1* | 4/2010 | Dexter et al. | | 220/4.12 |
| 2010/0132817 A1* | 6/2010 | Hewkin | | 137/544 |
| 2011/0062163 A1* | 3/2011 | Hewkin | | 220/562 |

FOREIGN PATENT DOCUMENTS

EP            1260685 A2 * 11/2002
WO      WO00/06874      2/2000

\* cited by examiner

INTEGRATED FILTER SYSTEM FOR A COOLANT RESERVOIR AND METHOD

CROSS REFERENCE TO RELATED APPLICATIONS

The present patent application claims priority from U.S. provisional patent application No. 61/117,996 filed Nov. 26, 2008. The entire contents of U.S. provisional patent application No. 61/117,996 are incorporated herein by reference and to the fullest extent of the law.

TECHNICAL FIELD

The present invention relates to a coolant reservoir for an internal combustion engine and, more particularly, to a coolant reservoir having an integrated coolant filtering system for removal of particulate contaminants from the coolant.

BACKGROUND OF THE INVENTION

As is well known, the operation of an internal combustion engine produces waste heat as well as mechanical energy. Liquid coolant systems are typically provided to remove this waste heat from the internal combustion engine to reduce operating temperature and to extend the life of mechanical parts and lubricants.

It is known to provide coolant reservoir tanks on liquid cooling systems, particularly cooling systems for internal combustion engines. Such reservoir tanks provide a surplus supply of coolant in reserve to compensate for inevitable minor leaks and evaporation. Coolant reservoir tanks additionally provide surge capacity for the storage of liquid coolant during engine operation. The volume of liquid coolants varies in relation to changes in coolant temperature. As the engine warms the coolant typically expands in volume. In such cases the coolant reservoir provides fluid storage capacity to accommodate this coolant surge while keeping it ready to return back to the coolant system when engine operation ceases. As can be seen, coolant necessarily flows between the coolant reservoir and the remaining coolant system due to changes in operating conditions of the engine, such as operating temperature changes and engine start/stop transitions.

During engine operation particulate contaminants may become entrained into the coolant. Such particulate contaminants may include, for example, rust or scale from coolant passages in the engine, dissolved minerals which may precipitate from the coolant, contaminants formed from chemical reactions between various fluid and engine system components, gasket materials, metallic and plastic debris resulting from mechanical wear of rotating or moving components into which the coolant comes into contact, as well as other causes.

It is well known that contaminants and debris, if not removed from the coolant, can accumulate upon the walls of engine and radiator system coolant passageways and thereby reduce the amount of heat transferred between engine/radiator components and the coolant. In an effort to address the coolant contaminant problem, several solutions have been developed.

In U.S. Pat. No. 3,726,262, a cooling system for an internal combustion engine includes a degassing line between the engine and coolant reservoir tank. A disposable filter is provided in the degassing line to filter coolant transitioning between the coolant system and the reservoir. The filter housing and filter element are not integrated internally into the coolant reservoir, and the solution is unnecessarily complex to manufacture and therefore unnecessarily costly.

Another solution is provided by U.S. Pat. No. 5,753,116 which discloses a separate coolant filter assembly for an engine coolant system.

Another coolant filtering solution is taught by PCT Publication number WO 00/06874. A coolant system for an internal combustion engine is disclosed including a radiator, a pump to circulate the coolant, a thermostatically operated bypass valve and a coolant reservoir equipped with a removable pleated cartridge assembly. The filter cartridge assembly is unnecessarily complex in materials and construction, resulting in an unnecessary higher cost and complex solution.

As can be seen, there is a need for an integrated filter system for a coolant reservoir tank that is simple in construction, low in cost, is easily replaced, and overcomes limitations of the prior art.

SUMMARY OF THE INVENTION

In one aspect of the invention, a filtered reservoir system for a cooling system includes a coolant reservoir having at least a first chamber and at least one second chamber with an interior wall substantially separating the first and second chambers. Coolant overflowing from an engine cooling system is directed to enter the first chamber. A cap member having a first engagement member is provided. A mounting member having a sleeve-like wall and a central aperture is sized and configured to receive a replaceable filter element within the central aperture. The sleeve-like wall includes a complimentary second engagement member configured and adapted for removeably mounting the cap member to the mounting member so as to close out the central aperture and form a cup-like depression. The mounting member protrudes downwards from a bottom wall of the reservoir to form the cup-like depression under the interior wall. The cup-like depression has a first portion in fluid communication with the first chamber and a second portion in fluid communication with the second chamber. A replaceable filter element configured to mount into the central aperture of the mounting member and adapted to filter particulates from coolant passing through the cup-like depression from the coolant flowing between the first and second chambers. The filter element includes a mounting flange sized and configured to abut against the sleeve-like wall, a support body having an interior void and secured at a first end to the mounting flange with the support body extending upwards into the second chamber and having at least one outlet aperture and at least one inlet aperture. The outlet and inlet apertures extend through the support body into the interior void. The filter element further includes at least one filter media member secured in the interior void and occluding the outlet apertures such that coolant exiting the outlet apertures must be filtered by the filter media member. The support body of the filter element has a planar first surface aligned with and abutting the interior wall. The first surface cooperates with the interior wall to provide fluid closure between the first and second chambers such that fluid flow through the cup-like depression between the first and second chambers is constrained to flow through the filter media.

In another aspect of the invention, the cooling system is configured to direct overflow coolant into the first chamber and the second chamber provides storage capacity for the overflow coolant.

In another aspect of the invention, a bypass passage is provided between the first and second chambers. The bypass passage is configured to permit fluid to bypass the filter element in the event the filter element becomes blocked. The bypass passage is positioned to define a second depression above the cup-like depression that is operative to entrap heavier particles from the coolant before they can pass from the first chamber to the second chamber.

In another aspect of the invention, the central aperture of the mounting member is generally circular and the support body has a generally semi-circular cross section.

In another aspect of the invention, the interior wall is offset from an axial center of the central aperture such that the first portion of the cup-like portion is larger than the second portion of the cup-like portion. The support body is sized to be received into the second portion of the cup-like depression. This offset enforces correct axial alignment of the filter element in the mounting member during installation of the filter element.

In another aspect of the invention, after installation of the filter element, the outlet apertures are positioned above the bottom wall and within the second chamber.

In another aspect of the invention, the sleeve-like wall includes a recess configured to receive the mounting flange of the support body. The mounting flange installs into the sleeve-like wall in a flush fashion and an annular seal member is provided to form a fluid seal between the sleeve-like member, the mounting flange and the cap member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an advantageously simple, low cost, replaceable coolant filtering system which is integrated in a coolant reservoir bottle or reservoir tank of an internal combustion engine liquid cooling system. The coolant filtering system intercepts coolant flowing between the engine cooling system and the coolant reservoir, removing particulates from the coolant by filtration, entrapping the removed particulates on the filter media as well as capturing larger particulates into a drainable cup-like depression provided within the coolant reservoir. The present invention also provides a coolant bypass passage operative to permit coolant to bypass the integrated filter should the filter media become blocked with contaminants. The bypass passage is positioned at an elevated location and cooperates with the cup-like depression to still permit heavier or larger particles to drop into the drainable cup-like depression when the filter is blocked, thereby removing a portion of the particulate contaminants from the coolant even when the coolant filter is blocked.

Figure 1:
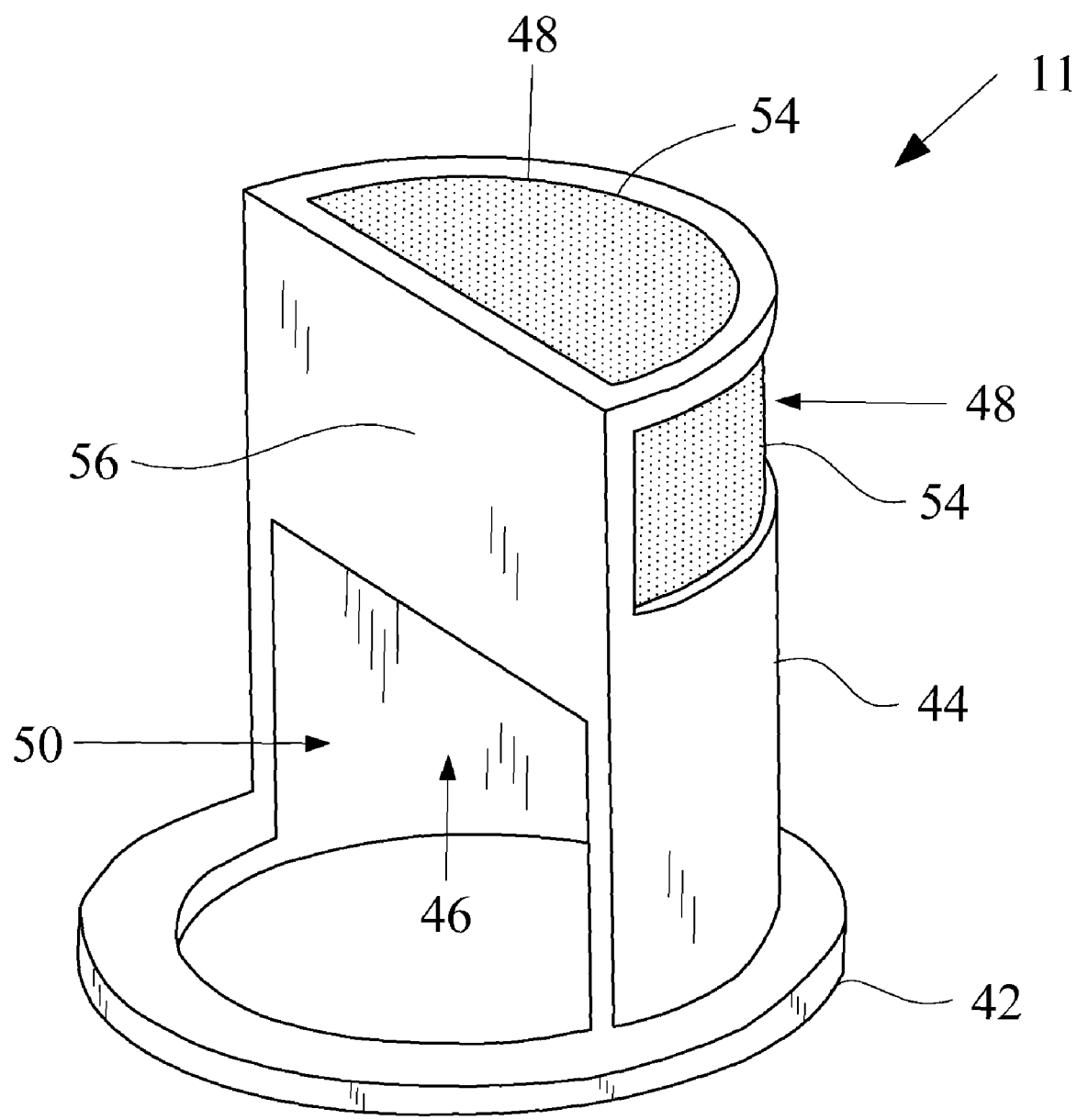
FIG. 1 illustrates one embodiment of a replaceable coolant filter element having a hollow support body and an annular ring-like mounting flange, consistent with the present invention.

FIG. 1 illustrates one embodiment of a replaceable coolant filter element 11 having an annular ring-like mounting flange 42, consistent with the present invention. A support body 44 is secured at one end to the mounting flange 42 and extends generally upwards. A fluid passage or void 46 is provided in the support body and extends between an inlet aperture 50 of the filter element 11 and filter media members 54. Filter media members 54 are secured to the support body 44 and occlude the outlet apertures 48 of the filter element 11 such that any coolant flowing between the inlet aperture 50 and the outlet apertures 48 is constrained to pass through the filter media members 54, thereby removing particulates from the coolant.

Figure 2:
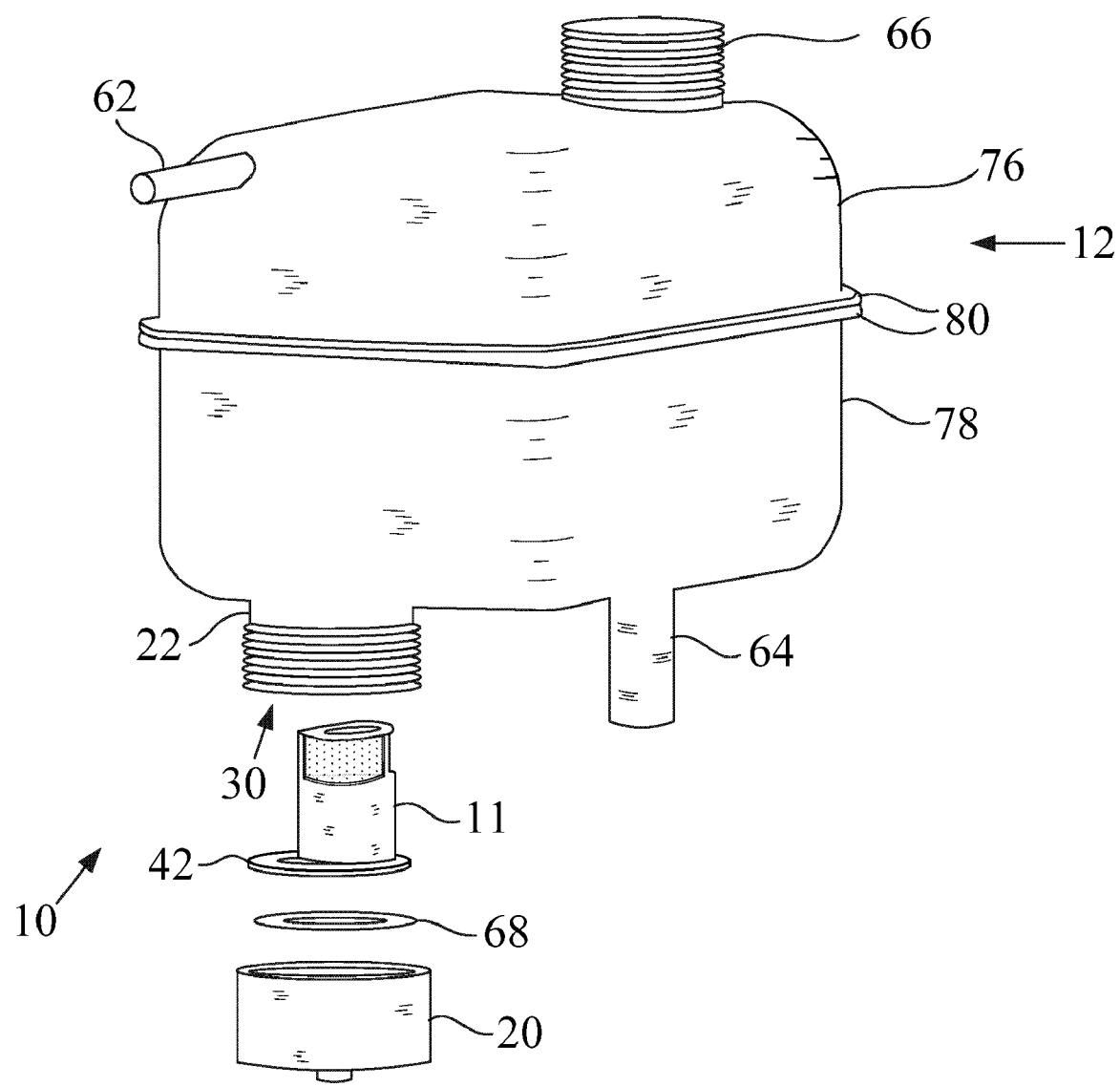
FIG. 2 illustrates a filtered reservoir system with a coolant reservoir having an integrated replaceable coolant filter element, consistent with the present invention.
Figure 3:
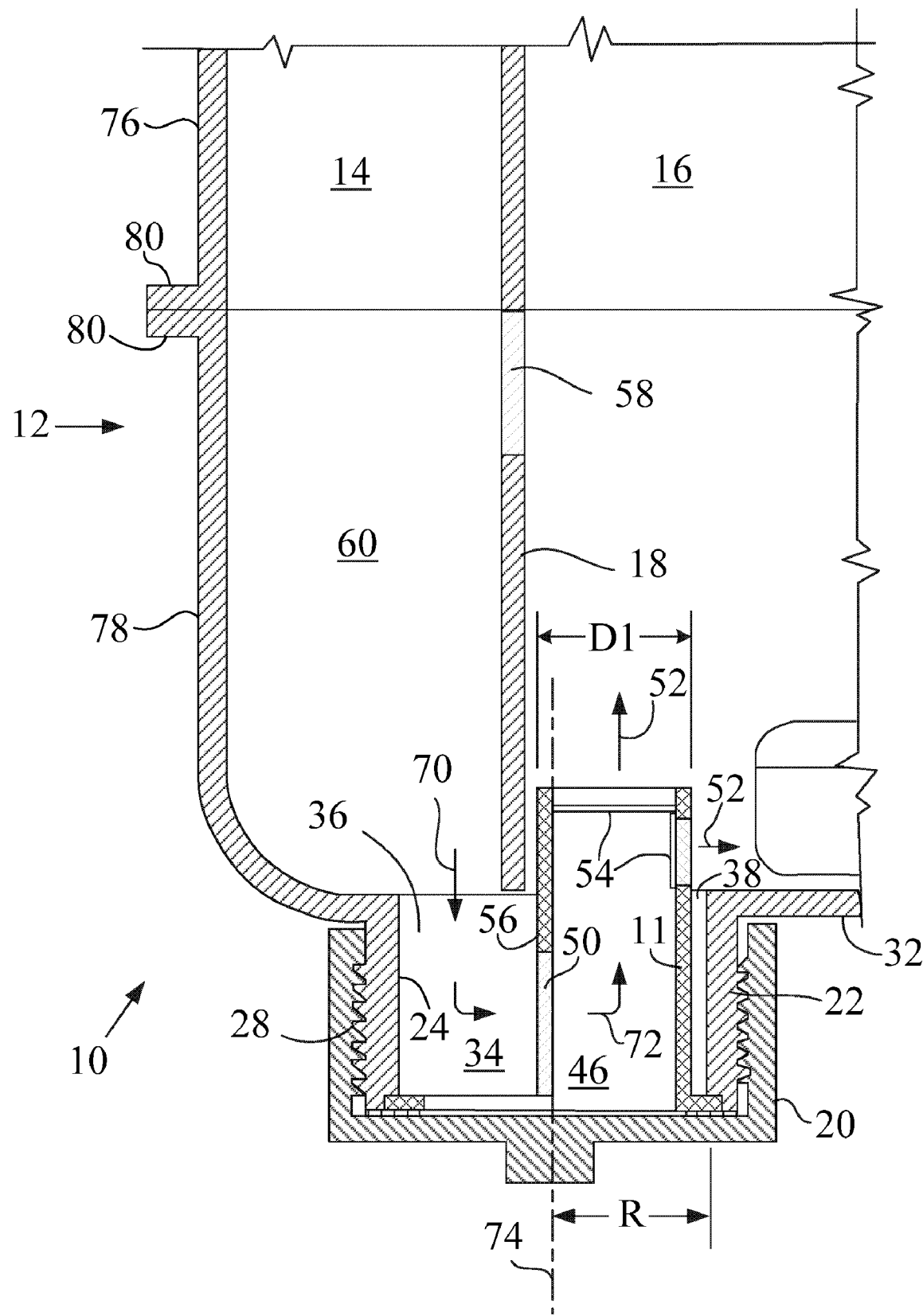
FIG. 3 provides a sectional side view of a portion of the filtered reservoir system depicted in FIG. 2, illustrating internal features of the present invention.

FIG. 2 illustrates a filtered reservoir system 10 including a coolant reservoir 12 integrated with a replaceable coolant filter element 11, consistent with the present invention. FIG. 3 is a sectional side view of a portion of the filtered reservoir system 10 depicted in FIG. 2. In all FIGS. 1-3 like components are identified with like labels. Coolant reservoir 12 has an upper housing portion 76 and a lower housing portion 78 that are permanently and closeably secured along complimentary mating flanges 80 to form a unitary reservoir 12. The housing portions 76 and 78 may be formed from a suitable plastic material by way of an injection molding process or using other materials and processes as would be known to those skilled in the art. Upper portion 76 and lower portion 78 may be secured by a suitable welding process such as hot plate welding, friction welding, ultrasonic welding, laser or IR welding to name a few examples.

An inlet tube 62 is operatively connected to deliver surge flows or overflow of coolant from an internal combustion engine cooling system (not shown) to the coolant reservoir 12. A coolant return line 64 or outlet tube is operatively connected to deliver coolant back into the engine cooling system (not shown) when makeup coolant is required. A fill neck 66 is provided on an upper portion of the coolant reservoir 12. The fill neck 66 may be provided with external threads or other engagement means to removeably mount a pressure cap or other closure cap (not shown) onto the fill neck 66.

A mounting member 22 is provided on a bottom wall 32 of the coolant reservoir 12. The mounting member has a sleeve-like wall 24 surrounding a central aperture 30 that is sized and configured to receive a portion of the replaceable filter element 11 therein. A cap member 20 is provided to removeably secure the filter element 11 within the central aperture 30. The cap member 20 includes engagement means, for example, threads sized and configured to removeably engage with complimentary engagement means provided on the outer wall of the mounting member 22. Annular gasket 68 is sized and configured to provide a fluid seal between the mounting member 22, filter element flange 42 and the cap member 20.

The central aperture 30 of the mounting member 22 is closed-off by cap member 20 and an annular gasket or seal member 68, forming a cup-like depression 34 under the interior wall 18 and below the bottom wall 32 of the reservoir. The filter element 11 installed into the central aperture 30 divides the cup-like member in a first portion 36 and a second portion 38. The first portion 36 is in fluid communication with the first chamber 14, while the second portion 38 is in fluid communication with a second chamber 16 of reservoir 12.

Coolant enters the coolant reservoir 12 through the inlet tube or vent line 62 and is received into the first chamber 14 (see FIG. 3) of the coolant reservoir 12. When the coolant level in the reservoir 12 is below the bypass passage 58, the fluid is constrained to flow through the filter element 11 as shown by arrow 70. Fluid flows downwards as shown by arrow 70 into the cup-like depression 34 and enters the inlet aperture 50 and void 46 of the filter element 11. Upon entering the inlet aperture 50, coolant flows upwards in the void 46 as shown by arrow 72 to intercept and be filtered through filter media members 54, thereby entering the second chamber 16. Particulates having a smaller size and lighter weight may aggregate at the filter media 54, while heavier particulates may tend to accumulate in the first 36 and second 38 portions of the cup-like depression 34 and within the void 46 in the support body 44, advantageously not reaching and occluding the filter media members 54. Filtered coolant exits the filter element 11 into the second chamber 16 as shown by arrows 52. The second chamber 16 is in fluid communication with the remainder of the coolant reservoir 12, providing storage capacity for the overflow coolant from the engine cooling system (not shown).

Advantageously, the support body 44 of the filter element 11 has a planar first surface 56 aligned and shaped to abut the interior wall 18 separating the first 14 and second 16 chambers. Due to its configuration, the planar first surface 56 that operates to effectively extend the interior wall 18 downwards and provide a substantial fluid seal between the first portion 36 and second portion 38, thereby preventing coolant from passing between the first chamber 14 and second chamber 16 in what would otherwise be a gap between the support body 44 and the interior wall 18.

Advantageously, particulates accumulate within the cup-like depression 34 and are blocked from entering the second chamber 16 as well as remaining portions of the reservoir 12 by the filter element 11. Accumulated particulates and debris in the cup-like depression 34 are drainable from the reservoir 12 when the cap member 20 is removed from the mounting member 22, such as when replacement of the filter element 11 is performed.

It is anticipated that the filter media members 54 of the filter element 11 may eventually become blocked due to the buildup of particulates or other contaminants. In such a case it may occur that coolant can no longer flow through the filter element 11 between the first chamber 14 and the second chamber 16. Advantageously, in the present invention, a bypass passage 58 is provided at an elevated location on the interior wall 18 to permit coolant to bypass the filter element 11 should the filter media 54 become blocked. Due to its elevated location, the bypass passage 58 defines a second depression 60 in the first chamber 14 positioned under the bypass passage 58. This second depression 60 is operative due to the effect of gravity on heavier particles, entrapping heavier particles in the coolant before they can enter the second chamber 16 through the bypass passage 58. Due to the shape of the second chamber, assisted by the action of gravity, these heavier particles tend to drop downwards from the second chamber in the second depression 60 and accumulate into the cup-like depression 34 where they may be later drained as discussed earlier.

In a preferred embodiment, the central aperture 30 of the mounting member 22 is generally circular in cross section, for example, with a cylindrical shape, as this shape generally agrees with a mounting member equipped with threads for a threaded removable cap member 20.

In a preferred embodiment, the support body 44 of the filter element 11 is shaped such that it has a generally semi-circular cross section.

In a preferred embodiment the interior wall 18 is positioned offset from an axial center 74 such that the first portion 36 of the cup-like depression 34 is larger in size than the second portion 38 of the cup-like depression 34, providing a support body 44 having a dimension D1 larger than a radius R of the cup-like depression 34, thereby enforcing proper axial alignment of the filter element 11 into the mounting member 22 during installation. Proper axial alignment, as illustrated in FIG. 3, is with the support body 44 extending upwards into the second chamber 16 and the planar first surface 56 abutting and closing against the interior wall 18.

As can be seen in FIGS. 1 and 3, the outlet apertures 48 are preferably positioned at an end of the support body opposing the flange 42 and positioned above the bottom wall 32 into the interior of the second chamber 16.

Also disclosed is a method of removing particulates from coolant within a coolant reservoir. The method is practiced by first providing a coolant reservoir having a filter element installed into a cup-like depression extending below a bottom wall of the reservoir. The cup-like depression and said filter element being operable to capture particulates from the coolant.

Next, a removable cap is provided on the cup-like depression. The cap is operable to drain the captured coolant particulates and to also provide access into the reservoir for replacement of the filter element.

Then a flow of coolant is introduced into the first chamber of a coolant reservoir. The flow of coolant between a first inlet chamber of the reservoir and a second chamber of the reservoir is constrained to pass through the filter element.

The filter element filters the coolant flowing between the first and second chambers in the filter element, thereby removing particulate contaminants from the coolant.

A portion of the contaminants then accumulates in the cup-like depression of the coolant reservoir.

A bypass passage is provided at an elevated position in the first chamber. This elevated position forms a second depression also adapted for capturing particulates in the coolant.

In the event of blockage in the filter element, coolant then flows through the second passage. Heavier particulates accumulate in the second depression and migrate towards the first depression.

Eventually the cap is removed to drain particulates from the cup-like depression and potentially also to replace the filter element. This ends the method.

It should be understood, of course, that the foregoing relates to exemplary embodiments of the invention and that modifications may be made without departing from the spirit and scope of the invention as set forth in the following claims.

The invention claimed is:

1. A filtered reservoir system for a cooling system, comprising:
 a coolant reservoir, said coolant reservoir having at least a first chamber, at least one second chamber and an interior wall substantially separating said first and second chambers, wherein coolant overflowing from said cooling system enters said first chamber;
 a cap member having a first engagement member;
 a mounting member having a sleeve-like wall and a central aperture sized and configured to receive a replaceable filter element therein, said sleeve-like wall having a complimentary second engagement member for removeably mounting said cap member to said mounting member to close out said central aperture, said mounting member protruding downwards from a bottom wall of said reservoir to form a cup-like depression under said interior wall, said cup-like depression having a first portion in fluid communication with said first chamber and a second portion in fluid communication with said second chamber;

said replaceable filter element configured to mount into said central aperture and adapted to filter particulates from coolant, said filter element having:
a mounting flange sized and configured to abut against said sleeve-like wall;
a support body having an interior void and secured at a first end to said mounting flange, said support body extending upwards into said second chamber and having at least one outlet aperture and at least one inlet aperture, said outlet and inlet apertures extending through said support body into said interior void; and
at least one filter media member secured in said interior void and occluding said outlet apertures such that coolant exiting said outlet apertures must be filtered by said filter media member;
wherein when said filter element is mounted in said cup-like depression, said inlet aperture is in fluid communication with said first chamber and said outlet apertures are in fluid communication with said second chamber,
wherein said support body has a planar first surface aligned with and abutting said interior wall, said first surface cooperating with said interior wall to provide fluid closure between said first and second chambers such that fluid flow through said cup-like depression between said first and second chambers is constrained to flow through said filter media.

2. The filtered reservoir system of claim 1, wherein
said cooling system is configured to direct overflow coolant into said first chamber; and
wherein said second chamber provides storage capacity for said overflow coolant.

3. The filtered reservoir system of claim 1, further comprising:
a bypass passage provided between said first said and second chambers, said bypass passage configured to permit fluid to bypass said filter element should said filter element become blocked, said bypass passage positioned to define a second depression above said cup-like depression operative to entrap heavier particles from said coolant before they can pass from said first chamber to said second chamber.

4. The filtered reservoir system of claim 1, wherein:
said central aperture of said mounting member is generally circular; and
said support body has a generally semi-circular cross section.

5. The filtered reservoir system of claim 4, wherein:
said interior wall is offset from an axial center of said central aperture such that said first portion of said cup-like portion is larger than said second portion of said cup-like portion;
wherein said support body is sized to be received into said second portion of said cup-like depression; and
wherein said offset enforces correct axial alignment of said filter element in said mounting member during installation of said filter element.

6. The filtered reservoir system of claim 5, wherein after installation of said filter element, said outlet apertures are positioned above said bottom wall and within said second chamber.

7. The filtered reservoir system of claim 5, wherein:
said sleeve-like wall includes a recess configured to receive said mounting flange of said support body wherein said mounting flange installs into said sleeve-like wall in a flush fashion; and
wherein an annular seal member forms a fluid seal between said sleeve-like member, said mounting flange and said cap member.

* * * * *